United States Patent
Wei

(10) Patent No.: US 10,534,171 B2
(45) Date of Patent: Jan. 14, 2020

(54) SHARING METHOD AND SHARING DEVICE

(71) Applicant: Beijing Zhigu Rui Tuo Tech Co., Ltd., Hai Dian District (CN)

(72) Inventor: Na Wei, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 177 days.

(21) Appl. No.: 15/267,247

(22) Filed: Sep. 16, 2016

(65) Prior Publication Data

US 2017/0115626 A1    Apr. 27, 2017

(30) Foreign Application Priority Data

Oct. 21, 2015   (CN) .......................... 2015 1 0689340

(51) Int. Cl.
   *G02B 27/01*    (2006.01)
   *G06F 3/01*     (2006.01)

(52) U.S. Cl.
   CPC ......... *G02B 27/0103* (2013.01); *G06F 3/013* (2013.01)

(58) Field of Classification Search
   USPC ....................................................... 709/217
   See application file for complete search history.

(56) References Cited

U.S. PATENT DOCUMENTS

| | | | | |
|---|---|---|---|---|
| 4,943,860 A | * | 7/1990 | Hattori ...................... | G02B 3/08 348/42 |
| 2012/0250306 A1 | * | 10/2012 | Sugiyama .............. | B60K 35/00 362/231 |
| 2012/0290257 A1 | | 11/2012 | Hodge et al. | |
| 2014/0192146 A1 | * | 7/2014 | Park ..................... | G03H 1/2286 348/40 |
| 2014/0368537 A1 | * | 12/2014 | Salter .................... | G06T 19/006 345/633 |
| 2015/0286829 A1 | * | 10/2015 | Amacker ......... | H04N 21/44218 726/27 |

FOREIGN PATENT DOCUMENTS

| CN | 102495959 A | 6/2012 |
|---|---|---|
| CN | 103714553 A | 4/2014 |
| CN | 104184738 A | 12/2014 |

OTHER PUBLICATIONS

Madhumita Venkataramanan, "How to transmit real-time holograms", Aug. 6, 2013, http://www.wired.co.uk/article/transmit-real-time-holograms.*

* cited by examiner

*Primary Examiner* — Brian Whipple
*Assistant Examiner* — John Fan
(74) *Attorney, Agent, or Firm* — Sheppard Mullin Richter & Hampton LLP

(57) ABSTRACT

Embodiments of the present application disclose a sharing method and a sharing device. The method comprises: determining at least one piece of first information associated with a field of view of at least one user; and determining a transmission policy of at least one hologram of the at least one user at least according to the at least one piece of first information, wherein the transmission policy comprises: a sequence that is determined, for any one of the at least one user, at least according to a degree of association between a field of view of at least one other user among the at least one user and a field of view of the any user and is for transmitting at least one hologram of the any user to the at least one other user.

36 Claims, 8 Drawing Sheets

SHARING METHOD AND SHARING DEVICE

TECHNICAL FIELD

The present application relates to the technical field of communications, and in particular, to a hologram sharing method and a hologram sharing device.

BACKGROUND

The augmented reality (AR) technology is a new technology for "seamlessly" integrating information in a real world with information in a virtual world. By the technology, entity information (such as visual information, sound, taste, and sense of touch) that is originally hard to experience within a spatial extension and temporal duration in the real world is simulated and emulated and is then superposed through science and technology such as computers, and virtual information is applied to the real world and sensed by human senses, thereby achieving sensory experience beyond reality. A real environment and a virtual object are superposed to one same image or space and exist simultaneously in real time.

The augmented reality technology comprises new technologies and new means such as multimedia, three-dimensional modeling, real-time video display and control, multi-sensor fusion, real-time tracking and registration, and scenario fusion. A user uses an augmented reality device (for example, wearing a head-wearing augmented reality device, such as Hololens of Microsoft). A plurality of groups of built-in cameras may model with regard to an environment in real time and set up a three-dimensional coordinate system in a space where the cameras are located. In addition, a sound and image sensor built in the device detects a voice instruction, a gesture instruction, and a direction of sight of the user, so as to confirm an operation of the user and then associate the operation and an actual object as well as a hologram, thereby providing a hologram-type experience. Along with the development of the augmented reality technology, there are more multi-user augmented reality interactive applications. For example, in a teaching scenario, users at different angles in one same physical space simultaneously view one or more holograms related to teaching. The users on the spot need to share the holograms and information about coordinates at which the users are located, so as to simultaneously view one or more holograms at different angles. For this objective, the holograms to be shared need to be transmitted among the augmented reality devices of the users, which undoubtedly raises a relatively high requirement for a network transmission environment. In particular, a large amount of data is transmitted accordingly for a hologram having a high degree of precision. Consequently, a relatively large load is caused for the network, and the quality of hologram transmission also has a huge influence on user experience.

SUMMARY

In view of the above, an objective of embodiments of the present application lies in providing a hologram sharing solution capable of reducing, as much as possible, a load on a network caused by augmented reality interactions.

To achieve the above objective, a first aspect of the embodiments of the present application provides a sharing method, comprising:

determining at least one piece of first information associated with a field of view of at least one user; and determining a transmission policy of at least one hologram of the at least one user at least according to the at least one piece of first information, wherein the transmission policy comprises: a sequence that is determined, for any one of the at least one user, at least according to a degree of association between a field of view of at least one other user among the at least one user and a field of view of the any user and is for transmitting at least one hologram of the any user to the at least one other user.

A second aspect of the embodiments of the present application provides a sharing method, comprising:

determining at least one piece of first information associated with a field of view of at least one user; and determining a sharing request policy of at least one hologram of the at least one user at least according to the at least one piece of first information, wherein the sharing request policy comprises: a sending sequence that is determined, for any one of the at least one user, at least according to a degree of association between a field of view of at least one other user among the at least one user and a field of view of the any user, and is for sending a sharing request of at least one hologram of the at least one other user.

A second aspect of the present application provides a sharing device, comprising:

a first determining module, configured to determine at least one piece of first information associated with a field of view of at least one user; and a second determining module, configured to determine a transmission policy of at least one hologram of the at least one user at least according to the at least one piece of first information, wherein the transmission policy comprises: a sequence that is determined, for any one of the at least one user, at least according to a degree of association between a field of view of at least one other user among the at least one user and a field of view of the any user and is for transmitting at least one hologram of the any user to the at least one other user.

A fourth aspect of the present application provides a sharing device, comprising:

a fourth determining module, configured to determine at least one piece of first information associated with a field of view of at least one user; and a fifth determining module, configured to determine a sharing request policy of at least one hologram of the at least one user at least according to the at least one piece of first information, wherein the sharing request policy comprises: a sending sequence that is determined, for any one of the at least one user, at least according to a degree of association between a field of view of at least one other user among the at least one user and a field of view of the any user, and is for sending a sharing request of at least one hologram of the at least one other user.

A fifth aspect of the present application provides a sharing device, comprising:

a memory, configured to store an instruction; and a processor, configured to execute the instruction stored in the memory, wherein the instruction enables the processor to execute the following steps:

determining at least one piece of first information associated with a field of view of at least one user; and determining a transmission policy of at least one hologram of the at least one user at least according to the at least one piece of first information, wherein the transmission policy comprises: a sequence that is determined, for any one of the at least one user, at least according to a degree of association between a field of view of at least one other user among the at least one user and a field of view of the any user and is for transmitting at least one hologram of the any user to the at least one other user.

A sixth aspect of the present application provides a sharing device, comprising:

a memory, configured to store an instruction; and a processor, configured to execute the instruction stored in the memory, wherein the instruction enables the processor to execute the following steps:

determining at least one piece of first information associated with a field of view of at least one user; and determining a sharing request policy of at least one hologram of the at least one user at least according to the at least one piece of first information, wherein the sharing request policy comprises: a sending sequence that is determined, for any one of the at least one user, at least according to a degree of association between a field of view of at least one other user among the at least one user and a field of view of the any user, and is for sending a sharing request of at least one hologram of the at least one other user.

The method and device of the embodiments of the present application can determine a transmission priority based on a degree of association with a field of view of a user, to further provide a reference for sequentially transmitting holograms, so as to reduce a load of a wireless network and improve user experience.

DETAILED DESCRIPTION

Specific implementations of the present application are described in further detail below with reference to the accompanying drawings and embodiments. The following embodiments are intended to describe the present application, but not to limit the scope of the present application.

It can be understood by a person skilled in the art that the terms such as "first" and "second" in the present application are only used to differentiate different devices, modules or parameters, and the terms neither represent any specific technical meaning, nor represent a inexorable logic sequence between the devices, the modules, or the parameters.

Figure 1:
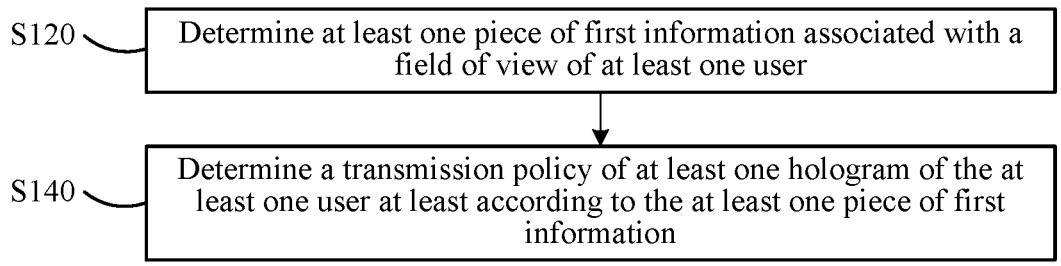
FIG. 1 is a flowchart of a first embodiment of a sharing method according to the present application.

FIG. 1 is a flowchart of a first embodiment of a sharing method according to the present application. The method may be implemented by any user side device (for example, an augmented reality device used by the user), or be implemented by a device independent from that of any user, for example, a central server configured to provide a multi-user hologram sharing service. As shown in FIG. 1, the method comprises:

S120: Determine at least one piece of first information associated with a field of view of at least one user.

In the method of the present embodiment, the at least first information means information about a field-of-view range, a user position, a user viewing angle, a user line-of-sight direction, and a user voice, any other information that can be used to determine a field-of-view range of a user or a correlation between field-of-view ranges of users, or any combination of the above information.

S140: Determine a transmission policy of at least one hologram of the at least one user at least according to the at least one piece of first information.

The transmission policy comprises: a sequence that is determined, for any one of the at least one user, at least according to a degree of association between a field of view of at least one other user among the at least one user and a field of view of the any user and is for transmitting at least one hologram of the any user to the at least one other user.

A field of view of a user can reflect a gaze intention of the user to a certain degree. The method of the present embodiment predicts a gaze intention of a user according to a field of view of the user, to further determine a sequence of transmitting holograms, that is, a priority of a target user to transmit a hologram: a hologram is preferably transmitted to a user having a high degree of association with the field of view.

As an example, in a possible sharing scenario, there are three users, A, B, and C. The user A needs to share at least one hologram of the user A with the user B and the user C. According to the method of the present embodiment, the user A has known a field-of-view range of the user A, and may separately obtain first information associated with the user B and the user C from the user B and the user C or another device, and determine a sequence of transmitting at least one hologram to be shared to the user B and the user C according to degrees of association between field-of-view ranges of the user B and the user C and the field-of-view range of the user A.

As another example, in a possible sharing scenario, there are three users, A, B, and C. A device that implements the method of the present embodiment needs to share at least one hologram of the user A with the user B and the user C. According to the method of the present embodiment, the device that implements the method of the present embodiment obtains first information associated with the three users from the users A, B, and C, respectively, and determines a sequence of transmitting at least one hologram of the user A to the user B and the user C according to degrees of association between field-of-view ranges of the user B and the user C and a field-of-view range of the user A.

As compared with transmission of content of a hologram, transmission of information associated with fields of view of the respective users needs less broadband. Therefore, in the method of the present embodiment, by predicting a gaze intention of a user according to a field-of-view range of the user, a reference for transmitting holograms according to a certain sequence can be provided, to further reduce a load of a wireless network caused by simultaneously sharing a hologram among multiple users and improve user experience.

Figure 2A:
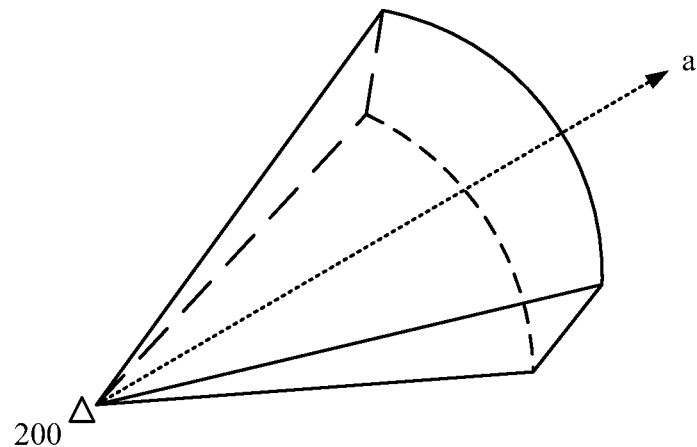
FIG. 2(a) is a schematic diagram of an exemplary field-of-view range.

As used in the present application, a field-of-view range may be defined as a part of or a whole field-of-view range (FOV), which means a directional field of view of user eyes or a device (for example, an augmented reality device) used by the user. The field-of-view range generally is shown in FIG. 2(a). When a user gazes a point or an area, in an ideal situation, for a spatial range using a user line-of-sight direction a as an axis, an isosceles triangle, of the spatial range, that is parallel to the user line-of-sight direction a and passes through a vertex user 200 can be assumed. It should be understood that the field-of-view range of the user can be determined by using any mature suitable technique in this field based on the first information. For example, a spatial range using a line-of-sight direction as an axis shown in FIG. 2(a) is determined based on a user position and a user line-of-sight direction.

In the method of the present embodiment, the degree of association with the field of view of the any user comprises: a degree of proximity with the field of view of the any user and/or an overlapping area with the field of view of the any user.

In a possible implementing manner, step S140 may further comprise:

S142: Determine, for any user, a degree of proximity between the field of view of the at least one other user and a field of view of the any user at least according to the first information.

S144: Determine a sequence for transmitting at least one hologram of the any user according to a sequence of degrees of proximity from proximal to distal.

That is, a user that is closer to the field-of-view range of the any user has a higher transmission priority. That is, the at least one hologram of the any user is preferably transmitted to a user closest to the field-of-view range of the any user.

Figure 2B:
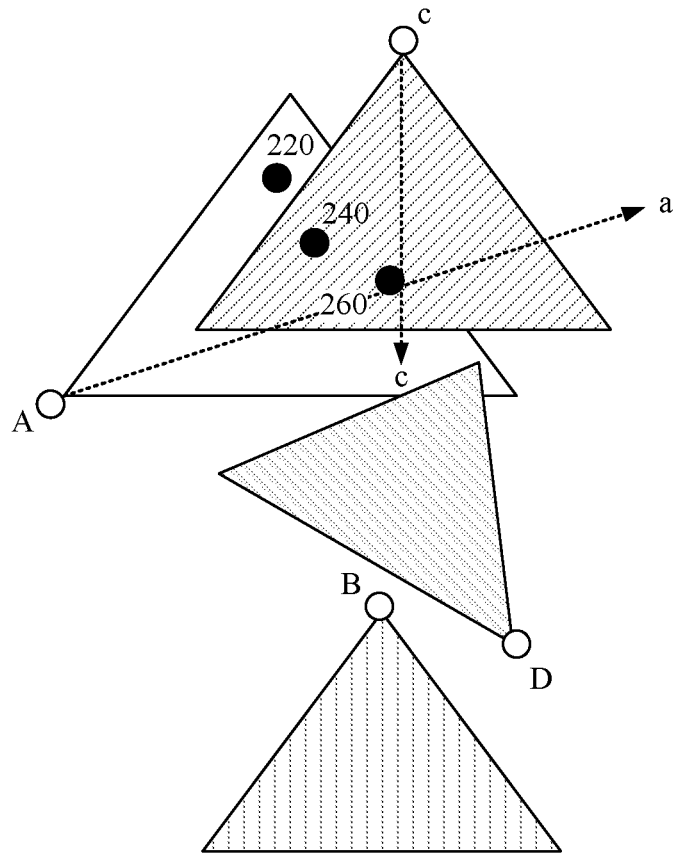
FIG. 2(b) illustrates an exemplary multi-user augmented reality application scenario.

For example, as shown in FIG. 2(b), degrees of proximity between respective field-of-view ranges of users B, C, and D and the field-of-view range of the user A are sequentially: the user C (filled by backslashes) is the closest, followed by the user D (filled by slashes) and the user B (filled by vertical stripes). Therefore, it can be determined that the at least one hologram of the user A is sequentially transmitted to: the user C, the user D, and the user B.

In another possible implementing manner, step S140 may further comprise:

Step S142': Determine, for any user, an overlapped range between the field of view of the at least one other user and a field of view of the any user at least according to the first information.

S144': Determine a sequence for transmitting at least one hologram of the any user according to a sequence of the overlapped ranges in descending order.

Still for example, as shown in FIG. 2(b), overlapping areas between respective field-of-view ranges of users B, C, and D and the field-of-view range of the user A sequentially in descending order are: the user C (filled by backslashes) is the largest, followed by the user D (filled by slashes) (the overlapping area is regarded as 0) and the user B (filled by vertical stripes). Therefore, it can be determined that the at least one hologram of the user A is sequentially transmitted to: the user C, the user D, and the user B.

It could be understood that overlapping is one type of proximity. If there is overlapping among field-of-view ranges, degrees of proximity may be sorted according to the overlapping areas. If there is not overlapping among field-of-view ranges, overlapping areas may be sorted in ascending order according to a sequence of degrees of proximity from distal to proximal. That is, a larger distance means a smaller overlapping area.

It should also be noted that field-of-view ranges of users are determined based on first information and degrees of association among the field-of-view ranges of all the users are determined based on the determined field-of-view ranges, but the method of the present embodiment may further comprise directly determining association among field-of-view ranges of all users based on first information. For example, based on voice information about the at least one user (for example, a voice instruction sent by a user to another user, or information about a voice call between at least two users), it can be predicted that field-of-view ranges of the at least two users may have a certain degree of association. For example, the at least two users may focus on one same target, and so on. Moreover, when there is a need to determine a transmission sequence for a plurality of users that are possibly associated, a degree of association may be determined based on positions of the respective users that are possibly associated.

In another possible implementing manner of the method of the present embodiment, for any user, there may be more than one hologram to be shared. To further reduce a transmission load of a wireless network caused by hologram sharing, the first information may comprise information associated with a gaze direction of a corresponding user, comprising: a user line-of-sight direction, spatial position information associated with a gaze point/area of the user, or any other information that can be used to determine the gaze direction of the user. Moreover, transmission priorities of a plurality of holograms may be further determined in a transmission policy. In this case, the transmission policy in the method of the present embodiment further comprises: a sequence that is determined, for the any user, at least according to a degree of association between a spatial position of at least one hologram of the any user and a gaze direction of at least one other user among the at least one user and is for transmitting the at least one hologram of the at least one user to the at least one other user. That is, a transmission priority of at least one hologram is determined according to a degree of association between a spatial position of at least one hologram to be shared and a gaze intention of a target to be shared with. That is, for any target to be shared with, a hologram that is mostly associated with a gaze intention of the any target to be shared with is preferably transmitted thereto. The degree of association between the spatial position of the hologram and the gaze direction may also be determined according to a degree of proximity and/or an overlapping area between the spatial position of the hologram and the gaze direction of the user. A hologram that is closest to the gaze direction of the user is preferably transmitted to the user.

As shown in FIG. 2(b), for the user C, according to degrees of association between the holograms 220, 240, and 260 and the gaze direction of the user C, the holograms 240 and 260 that fall within the field-of-view range of the user C should be preferably transmitted to the user C. Further, the hologram 260 that is closest to the gaze direction of the user C may preferably be transmitted to the user C based on the degrees of association between the holograms 240 and 260 and the line-of-sight direction of the user C (indicated by the dotted arrow c). To sum up, the three holograms of the user A transmitted to the user C are sequentially: the hologram 260, the hologram 240, and the hologram 220 (the hologram 220 may not be transmitted).

For any user, a spatial position of at least one hologram of the user may have been uploaded to a central server or may have been shared to other users. If the method of the present embodiment is executed by a device independent from that of any user, the method of the present embodiment further comprises:

S130: Determine at least one piece of second information associated with the spatial position of the at least one hologram of the at least one user.

The second information comprises: three-dimensional coordinates of the at least one hologram in a physical space in which a corresponding user is located and a corresponding coordinate system reference, so as to enable the device that executes the method of the present embodiment to determine a spatial position of a corresponding hologram in a field-of-view range of any user according to the corresponding coordinate system reference and the three-dimensional coordinates of the hologram, to further determine a degree of association with a gaze direction of the any user. Moreover, in this case, step S130 may comprise: receiving the at least one piece of second information from the at least one user.

In addition, the hologram sharing according to the method of the present embodiment may be initiated by a user or a third party device (a central server), or may also be initiated in response to a sharing request of any user. In this case, the method of the present embodiment further comprises:

S160: Send at least one hologram of the any user according to the transmission policy in response to a sharing request from the at least one other user.

In the scenario shown in FIG. 2(b), the user A may send the holograms 220, 240, and 260 in response to sharing requests from the users B, C, and D. First information and second information of all users may also be sent to a central server (not shown) regularly. The central server transmits the holograms 220, 240, and 260 of the user A in response to sharing requests from the users B, C, and D.

Similarly, as stated above, according to different roles of the device for executing the method of the present embodiment, the at least one piece of first information may be determined through receiving in step S120. For example, the at least one piece of first information from the at least one user is received, or first information corresponding to one or more users from a third party device such as a central server is received.

To sum up, the method of the present embodiment can determine a transmission priority of a user to share with and a transmission priority of a hologram to be shared according to a degree of association with a field of view and a gaze intention of a user, to further reduce a load of a wireless network and improve user experience.

Figure 3:
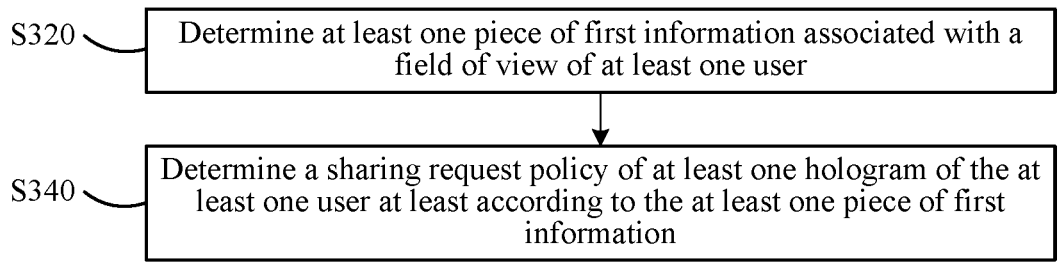
FIG. 3 is a flowchart of a second embodiment of the sharing method according to the present application.

FIG. 3 is a flowchart of a second embodiment of the sharing method according to the present application. The method may be implemented by any user side (for example, an augmented reality device used by the user). As shown in FIG. 3, the method comprises:

S320: Determine at least one piece of first information associated with a field of view of at least one user.

In the method of the present embodiment, the at least first information means information about a field-of-view range, a user position, a user viewing angle, a user line-of-sight direction, and a user voice, any other information that can be used to determine a field-of-view range of a user or a correlation between field-of-view ranges of users, or any combination of the above information.

S340: Determine a sharing request policy of at least one hologram of the at least one user at least according to the at least one piece of first information.

The sharing request policy comprises: a sending sequence that is determined, for any one of the at least one user, at least according to a degree of association between a field of view of at least one other user among the at least one user and a field of view of the any user, and is for sending a sharing request of at least one hologram of the at least one other user.

A field of view of a user can reflect a gaze intention of the user to a certain degree. In the method of the present embodiment, a sharing request sequence of the at least one hologram, that is, a priority of a target user to which a sharing request is sent, is determined according to a field of view of the user: the sharing request is preferably sent to a user having a high degree of association with the field of view.

As an example, in a possible sharing scenario, there are three users, A, B, and C. The user A needs to separately share at least one hologram of the user A with the user B and the user C. According to the method of the present embodiment, the user A has known a field-of-view range of the user A, and may separately obtain first information associated with field-of-view ranges of the user B and the user C from the user B and the user C or another device, and determine a sequence of sending a sharing request to the user B and the user C according to degrees of association between the field-of-view ranges of the user B and the user C and the field-of-view range of the user A.

As compared with transmission of content of a hologram, transmission of information associated with fields of view of the respective users needs less broadband. Therefore, in the method of the present embodiment, the sharing request sequence is determined according to the field-of-view ranges of the users, so as to enable at least one user that is requested to sequentially transmit a hologram in response to a sharing request, to further reduce a load caused on a wireless network by simultaneously transmitting shared holograms among a plurality of users and improve user experience.

In the method of the present embodiment, the degree of association with the field of view of the any user comprises: a degree of proximity with the field of view of the any user and/or an overlapping area with the field of view of the any user.

In a possible implementing manner, step S340 may further comprise:

S342: Determine, for any user, a degree of proximity between the field of view of the at least one other user and a field of view of the any user at least according to the first information.

S344: Determine a sharing request policy of at least one hologram of the at least one other user according to a sequence of degrees of proximity from proximal to distal.

That is, a user that is closer to the field-of-view range of the any user has a higher priority at which a sharing request is sent thereto. That is, the sharing request is preferably sent to a user that is closest to the field-of-view range of the any user.

For example, as shown in FIG. 2(b), degrees of proximity between respective field-of-view ranges of users B, C, and D and the field-of-view range of the user A are sequentially: the user C (filled by backslashes) is the closest, followed by the user D (filled by slashes) and the user B (filled by vertical stripes). Therefore, it can be determined that the user A sends the sharing request sequentially to: the user C, the user D, and the user B.

In another possible implementing manner, step S340 may further comprise:

S342': Determine, for any user, an overlapped range between the field of view of the at least one other user and a field of view of the any user at least according to the first information.

S344': Determine a sharing request policy of at least one hologram of the at least one other user according to a sequence of the overlapped ranges in descending order.

Still for example, as shown in FIG. 2(b), overlapping areas between respective field-of-view ranges of users B, C, and D and the field-of-view range of the user A sequentially in descending order are: the user C (filled by backslashes) is the largest, followed by the user D (filled by slashes) (the overlapping area is regarded as 0) and the user B (filled by vertical stripes). Therefore, it can be determined that the sharing request of the user A is sequentially sent to: the user C, the user D, and the user B.

It could be understood that overlapping is one type of proximity. If there is overlapping among field-of-view ranges, degrees of proximity may be sorted according to the overlapping areas. If there is not overlapping among field-of-view ranges, overlapping areas may be sorted in ascending order according to a sequence of degrees of proximity from distal to proximal. That is, a larger distance means a smaller overlapping area.

It should also be noted that field-of-view ranges of users are determined based on first information and degrees of association among the field-of-view ranges of all the users are determined based on the determined field-of-view ranges, but the method of the present embodiment may further comprise directly determining association among field-of-view ranges of all users based on first information. For example, based on voice information about the at least one user (for example, a voice instruction sent by a user to another user, or information about a voice call between at least two users), it can be predicted that field-of-view ranges of the at least two users may have a certain degree of association. For example, the at least two users may focus on one same target, and so on. Moreover, when there is a need to determine a transmission sequence for a plurality of users that are possibly associated, a degree of association may be determined based on positions of the respective users that are possibly associated.

In another possible implementing manner of the method of the present embodiment, for any user, there may be more than one hologram that can be shared. To further reduce a transmission load of a wireless network caused by hologram sharing, the first information may comprise information associated with a gaze direction of a corresponding user, comprising: a user line-of-sight direction, spatial position information associated with a gaze point/area of the user, or any other information that can be used to determine the gaze direction of the user. Moreover, a priority of requesting for a plurality of holograms may be further determined in the sharing request policy. In this case, the sharing request policy in the method of the present embodiment further comprises: a sequence that is determined, for the any user, at least according to a degree of association between a spatial position of a hologram of at least one other user among the at least one user and the gaze direction of the any user, and is for requesting sharing of at least one hologram of the at least one other user. That is, a priority of requesting for at least one hologram is determined according to a degree of association between a spatial position of at least one hologram to be shared and a gaze intention of a requesting party. That is, for any user, a hologram that is mostly associated with a gaze intention of the any user is preferably requested. The degree of association between the spatial position of the hologram and the gaze direction may also be determined according to a degree of proximity and/or an overlapping area between the spatial position of the hologram and the gaze direction of the user. A sharing request is preferably initiated for a hologram closest to the gaze direction.

As shown in FIG. 2(b), for the user A, according to degrees of association between the holograms 220, 240, and 260 and the gaze direction of the user A, the user A may preferably send, to the user C, a sharing request for the holograms 240 and 260 that fall within the field-of-view range of the user A. Further, a sharing request for the hologram 260 that is closest to the gaze direction of the user A may preferably be sent to the user C based on the degrees of association between the holograms 240 and 260 and the line-of-sight direction of the user A (indicated by the dotted arrow a). To sum up, the three holograms of the user A sent to the user C are sequentially: the hologram 260, the hologram 240, and the hologram 220 (the hologram 220 may not be transmitted). It should be noted that sharing requests in different sequences for a plurality of holograms of the same user may be integrated in one sharing request and sent, or a plurality of corresponding sharing requests is sent according to different sequences.

For any user, a spatial position of at least one hologram of the user may have been uploaded to a central server or may have been shared to other users. The method of the present embodiment further comprises:

S330: Determine at least one piece of second information associated with the spatial position of the at least one hologram of the at least one user.

The second information comprises: three-dimensional coordinates of the at least one hologram in a physical space in which a corresponding user is located and a corresponding coordinate system reference, so as to enable the device that executes the method of the present embodiment to determine a spatial position of a corresponding hologram in a field-of-view range of any user according to the corresponding coordinate system reference and the three-dimensional coordinates of the hologram, to further determine a degree of association with a gaze direction of the any user. Moreover, in this case, step S330 may comprise: receiving the at least one piece of second information from the at least one user.

Similarly, as stated above, the at least one piece of first information may be determined through receiving in step S320. For example, the at least one piece of first information from the at least one user is received, or first information corresponding to one or more users from a third party device such as a central server is received.

In addition, the method of the present embodiment further comprises:

S360: Send a sharing request according to the sharing request policy.

To sum up, the method of the present embodiment can determine a priority of sending a sharing request and a priority of requesting for a hologram to be shared according to a degree of association with a field of view and a gaze intention of a user, to further reduce a load of a wireless network and improve user experience.

In addition, if the device that executes the method of the present embodiment is an augmented reality device of the user, for example, Hololens worn by the user, the method of the present embodiment may further comprise:

S382: Receive at least one hologram from the at least one other user.

S384: Perform augmented reality presentation based on the at least one hologram.

The augmented reality presentation based on a hologram and information about a corresponding spatial position that is previously obtained is a relatively mature technology, which is not intended to limit the present technical solution herein.

It should be understood that in various embodiments of the present application, the value of the serial number of each step described above does not mean an execution sequence, and the execution sequence of each step should be determined according to the function and internal logic thereof, and should not be any limitation on the implementing process of the embodiments of the present application.

Besides, an embodiment of the present application further provides a computer-readable medium, comprising computer-readable instructions that perform, when being executed, the following operations: operations of executing the respective steps of the method in the implementing manner shown in FIG. 1.

Besides, an embodiment of the present application further provides a computer-readable medium, comprising computer-readable instructions that perform, when being executed, the following operations: operations of executing the respective steps of the method in the implementing manner shown in FIG. 3.

Figure 4A:
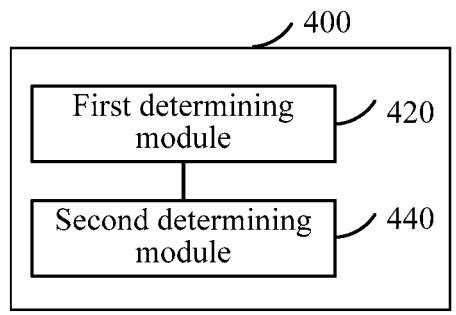
FIG. 4(a) to FIG. 4(d) are structural block diagrams of a plurality of examples of a first embodiment of a sharing device of the present application.

FIG. 4(a) is a structural block diagram of a first embodiment of a sharing device according to the present application. The device may be any user side device (for example, an augmented reality device used by the user), or be a device independent from the any user side device, for example, a central server configured to provide a multi-user hologram sharing service. As shown in FIG. 4(a), a device 400 may comprise: a first determining module 420 and a second determining module 440.

The first determining module 420 is configured to determine at least one piece of first information associated with a field of view of at least one user.

In the device of the present embodiment, the at least first information means information about a field-of-view range, a user position, a user viewing angle, a user line-of-sight direction, and a user voice, any other information that can be used to determine a field-of-view range of a user or a correlation between field-of-view ranges of users, or any combination of the above information. It should be understood that the field-of-view range of the user can be determined by using any mature suitable technique in this field based on the first information. For example, a spatial range using a line-of-sight direction as an axis shown in FIG. 2(a) is determined based on a user position and a user line-of-sight direction.

The second determining module 440 is configured to determine a transmission policy of at least one hologram of the at least one user at least according to the at least one piece of first information.

The transmission policy comprises: a sequence that is determined, for any one of the at least one user, at least according to a degree of association between a field of view of at least one other user among the at least one user and a field of view of the any user and is for transmitting at least one hologram of the any user to the at least one other user.

A field of view of a user can reflect a gaze intention of the user to a certain degree. The method of the present embodiment predicts a gaze intention of a user according to a field of view of the user, to further determine a sequence of transmitting holograms, that is, a priority of a target user to transmit a hologram: a hologram is preferably transmitted to a user having a high degree of association with the field of view.

As an example, in a possible sharing scenario, there are three users, A, B, and C. The user A needs to share at least one hologram of the user A with the user B and the user C. By using the device of the present embodiment, the user A has known a field-of-view range of the user A, and may separately obtain first information associated with the user B and the user C from the user B and the user C or another device, and determine a sequence of transmitting at least one hologram to be shared to the user B and the user C according to degrees of association between field-of-view ranges of the user B and the user C and the field-of-view range of the user A.

As another example, in a possible sharing scenario, there are three users, A, B, and C. The device of the present embodiment needs to share at least one hologram of the user A with the user B and the user C. The device of the present embodiment obtains first information associated with the three users from the users A, B, and C, respectively, and determines a sequence of transmitting at least one hologram of the user A to the user B and the user C according to degrees of association between field-of-view ranges of the user B and the user C and a field-of-view range of the user A.

As compared with transmission of content of a hologram, transmission of information associated with fields of view of the respective users needs less broadband. Therefore, in the device of the present embodiment, by predicting a gaze intention of a user according to a field-of-view range of the user, a reference for transmitting holograms according to a certain sequence can be provided, to further reduce a load of a wireless network caused by simultaneously sharing a hologram among multiple users and improve user experience.

In the device of the present embodiment, the degree of association with the field of view of the any user comprises: a degree of proximity with the field of view of the any user and/or an overlapping area with the field of view of the any user.

Figure 4B:
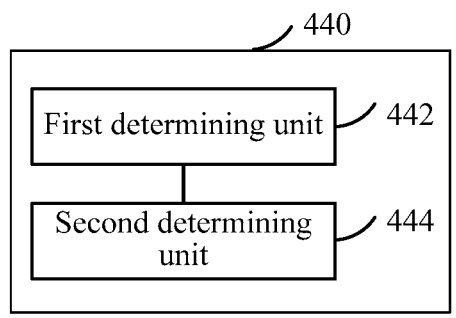

As shown in FIG. 4(b), the second determining module 440 may further comprise: a first determining unit 442 and a second determining unit 444. In a possible implementing manner:

The first determining unit 442 may be configured to determine, for any user, a degree of proximity between the field of view of the at least one other user and a field of view of the any user at least according to the first information.

The second determining unit 444 may be configured to determine a sequence for transmitting at least one hologram of the any user according to a sequence of degrees of proximity from proximal to distal.

That is, a user that is closer to the field-of-view range of the any user has a higher transmission priority. That is, the at least one hologram of the any user is preferably transmitted to a user closest to the field-of-view range of the any user.

For example, as shown in FIG. 2(b), degrees of proximity between respective field-of-view ranges of users B, C, and D and the field-of-view range of the user A are sequentially: the user C (filled by backslashes) is the closest, followed by the user D (filled by slashes) and the user B (filled by vertical stripes). Therefore, it can be determined that the at least one hologram of the user A is sequentially transmitted to: the user C, the user D, and the user B.

In another possible implementing manner:

The first determining unit 442 may be configured to determine, for any user, an overlapped range between the field of view of the at least one other user and a field of view of the any user at least according to the first information.

The second determining unit 444 may be configured to determine a sequence for transmitting at least one hologram of the any user according to a sequence of the overlapped ranges in descending order.

Still for example, as shown in FIG. 2(b), overlapping areas between respective field-of-view ranges of users B, C, and D and the field-of-view range of the user A sequentially in descending order are: the user C (filled by backslashes) is the largest, followed by the user D (filled by slashes) (the overlapping area is regarded as 0) and the user B (filled by vertical stripes). Therefore, it can be determined that the at least one hologram of the user A is sequentially transmitted to: the user C, the user D, and the user B.

It could be understood that overlapping is one type of proximity. If there is overlapping among field-of-view ranges, degrees of proximity may be sorted according to the overlapping areas. If there is not overlapping among field-of-view ranges, overlapping areas may be sorted in ascending order according to a sequence of degrees of proximity from distal to proximal. That is, a larger distance means a smaller overlapping area.

It should also be noted that field-of-view ranges of users are determined based on first information and degrees of association among the field-of-view ranges of all the users are determined based on the determined field-of-view ranges, but the method of the present embodiment may further comprise directly determining association among field-of-view ranges of all users based on first information. For example, based on voice information about the at least one user (for example, a voice instruction sent by a user to another user, or information about a voice call between at least two users), it can be predicted that field-of-view ranges of the at least two users may have a certain degree of association. For example, the at least two users may focus on one same target, and so on. Moreover, when there is a need to determine a transmission sequence for a plurality of users that are possibly associated, a degree of association may be determined based on positions of the respective users that are possibly associated.

In another possible implementing manner of the device of the present embodiment, for any user, there may be more than one hologram to be shared. To further reduce a transmission load of a wireless network caused by hologram sharing, the first information may comprise information associated with a gaze direction of a corresponding user, comprising: a user line-of-sight direction, spatial position information associated with a gaze point/area of the user, or any other information that can be used to determine the gaze direction of the user. Moreover, transmission priorities of a plurality of holograms may be further determined in a transmission policy. In this case, the transmission policy determined by the second determining module 440 in the device of the present embodiment further comprises: a sequence that is determined, for the any user, at least according to a degree of association between a spatial position of at least one hologram of the any user and a gaze direction of at least one other user among the at least one user and is for transmitting the at least one hologram of the at least one user to the at least one other user. That is, a transmission priority of at least one hologram is determined according to a degree of association between a spatial position of at least one hologram to be shared and a gaze intention of a target to be shared with. That is, for any target to be shared with, a hologram that is mostly associated with a gaze intention of the any target to be shared with is preferably transmitted thereto. The degree of association between the spatial position of the hologram and the gaze direction may also be determined according to a degree of proximity and/or an overlapping area between the spatial position of the hologram and the gaze direction of the user. A hologram that is closest to the gaze direction of the user is preferably transmitted to the user.

As shown in FIG. 2(b), for the user C, according to degrees of association between the holograms 220, 240, and 260 and the gaze direction of the user C, the holograms 240 and 260 that fall within the field-of-view range of the user C should be preferably transmitted to the user C. Further, the hologram 260 that is closest to the gaze direction of the user C may preferably be transmitted to the user C based on the degrees of association between the holograms 240 and 260 and the line-of-sight direction of the user C (indicated by the dotted arrow c). To sum up, the three holograms of the user A transmitted to the user C are sequentially: the hologram 260, the hologram 240, and the hologram 220 (the hologram 220 may not be transmitted).

Figure 4C:
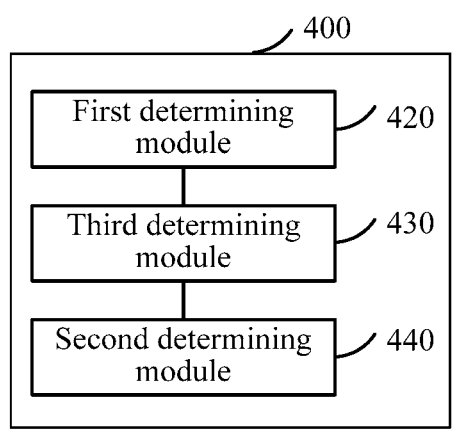

For any user, a spatial position of at least one hologram of the user may have been uploaded to a central server or may have been shared to other users. If the device of the present embodiment is independent from the device of the any user, as shown in FIG. 4(c), the device 400 of the present embodiment may further comprise:

a third determining module 430, configured to determine at least one piece of second information associated with the spatial position of the at least one hologram of the at least one user.

The second information comprises: three-dimensional coordinates of the at least one hologram in a physical space in which a corresponding user is located and a corresponding coordinate system reference, so as to enable the device that executes the method of the present embodiment to determine a spatial position of a corresponding hologram in a field-of-view range of any user according to the corresponding coordinate system reference and the three-dimensional coordinates of the hologram, to further determine a degree of association with a gaze direction of the any user. Moreover, in this case, the third determining module 430 may determine the at least one piece of second information of the at least one user through receiving.

Figure 4D:
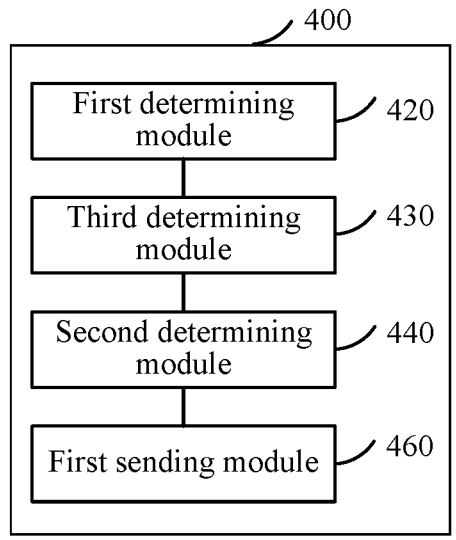

In addition, the hologram sharing implemented by the device of the present embodiment may be initiated by a user or a third party device (a central server), or may also be initiated in response to a sharing request of any user. In this case, as shown in FIG. 4(d), the device 400 of the present embodiment may further comprise:

a first sending module 460, configured to send at least one hologram of the any user according to the transmission policy in response to a sharing request from the at least one other user.

In the scenario shown in FIG. 2(b), the user A may send the holograms 220, 240, and 260 in response to sharing requests from the users B, C, and D. First information and second information of all users may also be sent to a central server (not shown) regularly. The central server transmits the holograms 220, 240, and 260 of the user A in response to sharing requests from the users B, C, and D.

Similarly, as stated above, according to different roles of the device of the present embodiment, the first determining module 420 may determine the at least one piece of first information through receiving. For example, the at least one piece of first information from the at least one user is received, or first information corresponding to one or more users from a third party device such as a central server is received.

To sum up, the device of the present embodiment can determine a transmission priority of a user to share with and a transmission priority of a hologram to be shared according to a degree of association with a field of view and a gaze intention of a user, to further reduce a load of a wireless network and improve user experience.

FIG. 5(*a*) is a structural block diagram of a second embodiment of the sharing device according to the present application. The device may be any user side device (for example, being or belonging to an augmented reality device used by the user). As shown in FIG. 5(*a*), a device 500 may comprise: a fourth determining module 520 and a fifth determining module 540.

The fourth determining module 520 is configured to determine at least one piece of first information associated with a field of view of at least one user.

In the device of the present embodiment, the at least first information means information about a field-of-view range, a user position, a user viewing angle, a user line-of-sight direction, and a user voice, any other information that can be used to determine a field-of-view range of a user or a correlation between field-of-view ranges of users, or any combination of the above information.

The fifth determining module 540 is configured to determine a sharing request policy of at least one hologram of the at least one user at least according to the at least one piece of first information.

The sharing request policy comprises: a sending sequence that is determined, for any one of the at least one user, at least according to a degree of association between a field of view of at least one other user among the at least one user and a field of view of the any user, and is for sending a sharing request of at least one hologram of the at least one other user.

A field of view of a user can reflect a gaze intention of the user to a certain degree. The device of the present embodiment determines a sharing request sequence of the at least one hologram, that is, a priority of a target user to which a sharing request is sent, according to a field of view of the user: the sharing request is preferably sent to a user having a high degree of association with the field of view.

As an example, in a possible sharing scenario, there are three users, A, B, and C. The user A needs to separately share at least one hologram of the user A with the user B and the user C. By using the device of the present embodiment, the user A has known a field-of-view range of the user A, and may separately obtain first information associated with field-of-view ranges of the user B and the user C from the user B and the user C or another device, and determine a sequence of sending a sharing request to the user B and the user C according to degrees of association between the field-of-view ranges of the user B and the user C and the field-of-view range of the user A.

As compared with transmission of content of a hologram, transmission of information associated with fields of view of the respective users needs less broadband. Therefore, in the device of the present embodiment, the sharing request sequence is determined according to the field-of-view ranges of the users, so as to enable at least one user that is requested to sequentially transmit a hologram in response to a sharing request, to further reduce a load caused on a wireless network by simultaneously transmitting shared holograms among a plurality of users and improve user experience.

In the device of the present embodiment, the degree of association with the field of view of the any user comprises: a degree of proximity with the field of view of the any user and/or an overlapping area with the field of view of the any user.

As shown in FIG. 5(*b*), the fifth determining module 540 may further comprise: a third determining unit 542 and a fourth determining unit 544.

In a possible implementing manner:

The third determining unit 542 may be configured to determine, for any user, a degree of proximity between the field of view of the at least one other user and a field of view of the any user at least according to the first information.

The fourth determining unit 544 may be configured to determine a sharing request policy of at least one hologram of the at least one other user according to a sequence of degrees of proximity from proximal to distal.

That is, a user that is closer to the field-of-view range of the any user has a higher priority at which a sharing request is sent thereto. That is, the sharing request is preferably sent to a user that is closest to the field-of-view range of the any user.

For example, as shown in FIG. 2(*b*), degrees of proximity between respective field-of-view ranges of users B, C, and D and the field-of-view range of the user A are sequentially: the user C (filled by backslashes) is the closest, followed by the user D (filled by slashes) and the user B (filled by vertical stripes). Therefore, it can be determined that the user A sends the sharing request sequentially to: the user C, the user D, and the user B.

In another possible implementing manner:

The third determining unit 542 may be configured to determine, for any user, an overlapped range between the field of view of the at least one other user and a field of view of the any user at least according to the first information.

The fourth determining unit 544 may be configured to determine a sharing request policy of at least one hologram of the at least one other user according to a sequence of the overlapped ranges in descending order.

Still for example, as shown in FIG. 2(*b*), overlapping areas between respective field-of-view ranges of users B, C, and D and the field-of-view range of the user A sequentially in descending order are: the user C (filled by backslashes) is the largest, followed by the user D (filled by slashes) (the overlapping area is regarded as 0) and the user B (filled by vertical stripes). Therefore, it can be determined that the sharing request of the user A is sequentially sent to: the user C, the user D, and the user B.

It could be understood that overlapping is one type of proximity. If there is overlapping among field-of-view ranges, degrees of proximity may be sorted according to the overlapping areas. If there is not overlapping among field-of-view ranges, overlapping areas may be sorted in ascending order according to a sequence of degrees of proximity from distal to proximal. That is, a larger distance means a smaller overlapping area.

It should also be noted that field-of-view ranges of users are determined based on first information and degrees of association among the field-of-view ranges of all the users are determined based on the determined field-of-view ranges, but the method of the present embodiment may further comprise directly determining association among field-of-view ranges of all users based on first information. For example, based on voice information about the at least one user (for example, a voice instruction sent by a user to another user, or information about a voice call between at least two users), it can be predicted that field-of-view ranges of the at least two users may have a certain degree of association. For example, the at least two users may focus on one same target, and so on. Moreover, when there is a need to determine a transmission sequence for a plurality of users that are possibly associated, a degree of association may be determined based on positions of the respective users that are possibly associated.

In another possible implementing manner of the device of the present embodiment, for any user, there may be more than one hologram that can be shared. To further reduce a transmission load of a wireless network caused by hologram sharing, the first information may comprise information associated with a gaze direction of a corresponding user, comprising: a user line-of-sight direction, spatial position information associated with a gaze point/area of the user, or any other information that can be used to determine the gaze direction of the user. Moreover, a priority of requesting for a plurality of holograms may be further determined in the sharing request policy. In this case, the sharing request policy determined by the fifth determining module 540 further comprises: a sequence that is determined, for the any user, at least according to a degree of association between a spatial position of a hologram of at least one other user among the at least one user and the gaze direction of the any user, and is for requesting sharing of at least one hologram of the at least one other user. That is, a priority of requesting for at least one hologram is determined according to a degree of association between a spatial position of at least one hologram to be shared and a gaze intention of a requesting party. That is, for any user, a hologram that is mostly associated with a gaze intention of the any user is preferably requested. The degree of association between the spatial position of the hologram and the gaze direction may also be determined according to a degree of proximity and/or an overlapping area between the spatial position of the hologram and the gaze direction of the user. A sharing request is preferably initiated for a hologram closest to the gaze direction.

As shown in FIG. 2(b), for the user A, according to degrees of association between the holograms 220, 240, and 260 and the gaze direction of the user A, the user A may preferably send, to the user C, a sharing request for the holograms 240 and 260 that fall within the field-of-view range of the user A. Further, a sharing request for the hologram 260 that is closest to the gaze direction of the user A may preferably be sent to the user C according to the degrees of association between the holograms 240 and 260 and the line-of-sight direction of the user A (indicated by the dotted arrow a). To sum up, the three holograms of the user A sent to the user C are sequentially: the hologram 260, the hologram 240, and the hologram 220 (the hologram 220 may not be transmitted). It should be noted that sharing requests in different sequences for a plurality of holograms of the same user may be integrated in one sharing request and sent, or a plurality of corresponding sharing requests is sent according to different sequences.

Figure 5A:
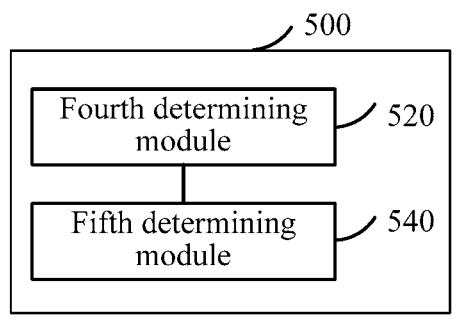
FIG. 5(a) to FIG. 5(e) are structural block diagrams of a plurality of examples of a second embodiment of the sharing device of the present application.
Figure 5B:
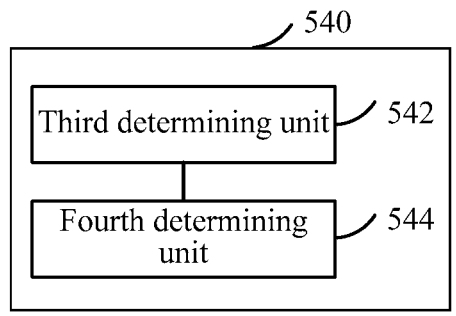
Figure 5C:
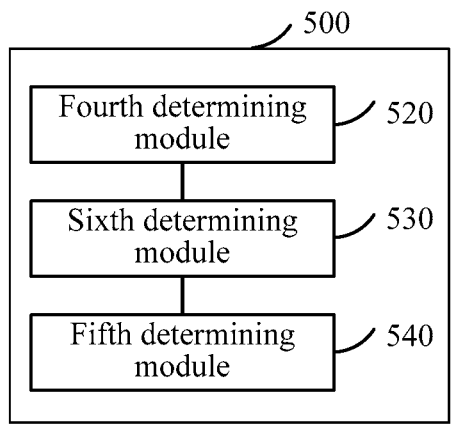

For any user, a spatial position of at least one hologram of the user may have been uploaded to a central server or may have been shared to other users. As shown in FIG. 5(c), the device 500 of the present embodiment may further comprise:

a sixth determining module 530, configured to determine at least one piece of second information associated with the spatial position of the at least one hologram of the at least one user.

The second information comprises: three-dimensional coordinates of the at least one hologram in a physical space in which a corresponding user is located and a corresponding coordinate system reference, so as to enable the device that executes the method of the present embodiment to determine a spatial position of a corresponding hologram in a field-of-view range of any user according to the corresponding coordinate system reference and the three-dimensional coordinates of the hologram, to further determine a degree of association with a gaze direction of the any user. Moreover, in this case, the sixth determining module 530 may determine the at least one piece of second information of the at least one user through receiving.

Similarly, as stated above, the fourth determining module 520 may also determine the at least one piece of first information through receiving. For example, the at least one piece of first information from the at least one user is received, or first information corresponding to one or more users from a third party device such as a central server is received.

Figure 5D:
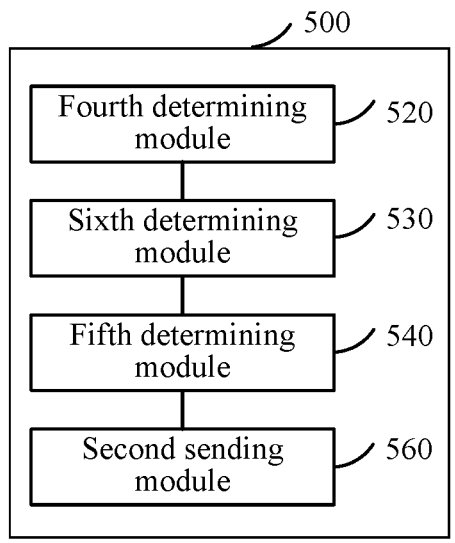

In addition, as shown in FIG. 5(d), the device 500 the present embodiment may further comprise:

a second sending module 560, configured to send a sharing request according to the sharing request policy.

To sum up, the process of the present embodiment can determine a priority of sending a sharing request and a priority of requesting for a hologram to be shared according to a degree of association with a field of view and a gaze intention of a user, to further reduce a load of a wireless network and improve user experience.

Figure 5E:
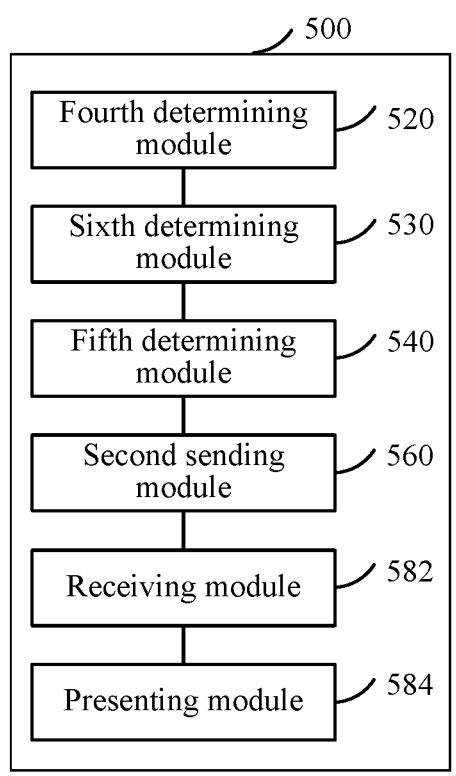

In addition, if the device that executes the method of the present embodiment is an augmented reality device of the user, for example, Hololens worn by the user, as shown in FIG. 5(e), the device 500 of the present embodiment may further comprise:

a receiving module 582, configured to receive at least one hologram from the at least one other user; and a presenting module 584, configured to perform augmented reality presentation based on the at least one hologram.

The augmented reality presentation based on a hologram and information about a corresponding spatial position that is previously obtained is a relatively mature technology, which is not intended to limit the present technical solution herein.

Figure 6:
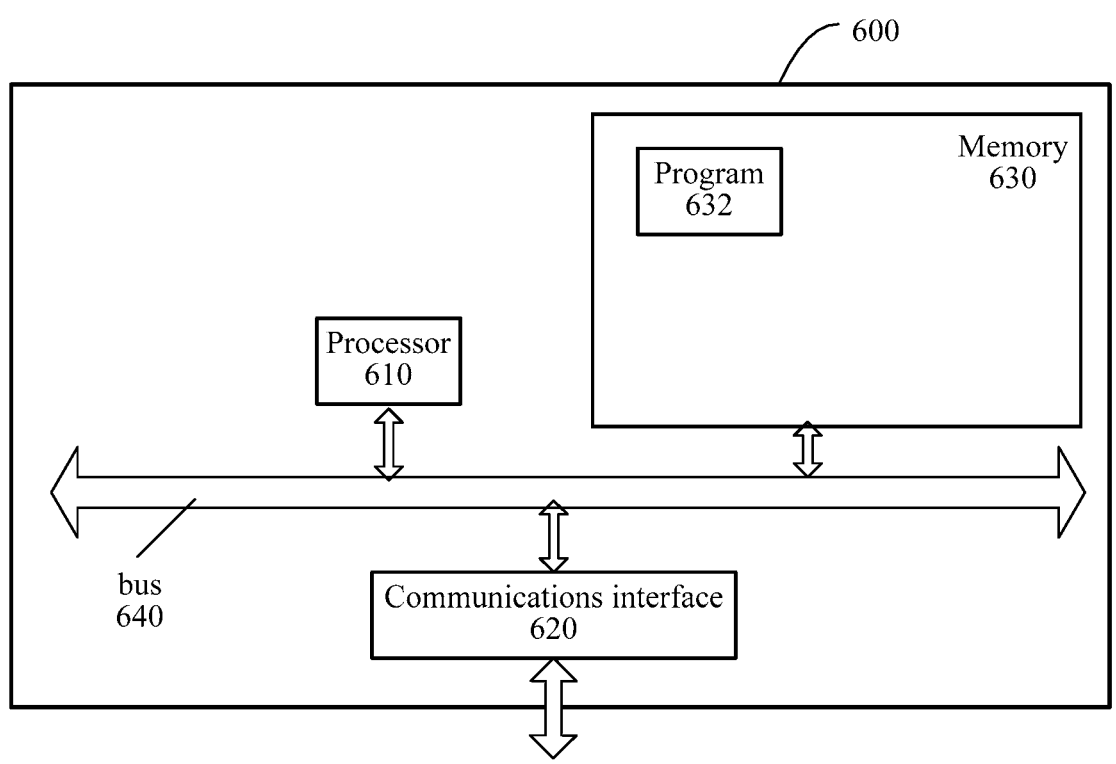
FIG. 6 is a structural block diagram of another example of the first embodiment of the sharing device of the present application.

FIG. 6 is a schematic structural diagram of another example of the first embodiment of the sharing device of the present application. The specific embodiments of the present application are not intended to limit the specific implementation of the sharing device. As shown in FIG. 6, a sharing device 600 may comprise:

a processor 610, a communications interface 620, a memory 630, and a communications bus 640, wherein:

the processor 610, the communications interface 620, and the memory 630 communicate with each other by using the communications bus 640;

the communications interface 620 is configured to communicate with a network element such as a client; and the processor 610 is configured to execute a program 632, and specifically can perform relevant steps in the aforementioned embodiments of the method shown in FIG. 1.

Specifically, the program 632 may comprise program code, wherein the program code comprises a computer operation instruction.

The processor 610 may be a Central Processing Unit (CPU), an Application Specific Integrated Circuit (ASIC), or one or more integrated circuits configured to implement the embodiments of the present application.

The memory 630 is configured to store the program 632. The memory 630 may comprise a high speed RAM memory, or may also comprise a non-volatile memory such as at least one magnetic disk storage. The program 632 may specifically be configured to cause the sharing device 600 to execute the following steps:

determining at least one piece of first information associated with a field of view of at least one user; and determining a transmission policy of at least one hologram of the at least one user at least according to the at least one piece of first information, wherein the transmission policy comprises: a sequence that is determined, for any one of the at least one user, at least according to a degree of association between a field of view of at least one other user among the at least one user and a field of view of the any user and is for transmitting at least one hologram of the any user to the at least one other user.

For the specific implementation of the steps in the program 632, refer to the corresponding descriptions of corresponding steps and units in the foregoing embodiments, which are not described herein again. It may be clearly understood by a person skilled in the art that, for the purpose of convenient and brief description, reference may be made to the description of corresponding processes in the foregoing method embodiments for detailed working processes of the foregoing devices and modules, and details are not described herein again.

It may be clearly understood by a person skilled in the art that, for the purpose of convenient and brief description, reference may be made to the description of corresponding processes in the foregoing apparatus embodiments for detailed working processes of the foregoing devices and modules, and details are not described herein again.

Figure 7:
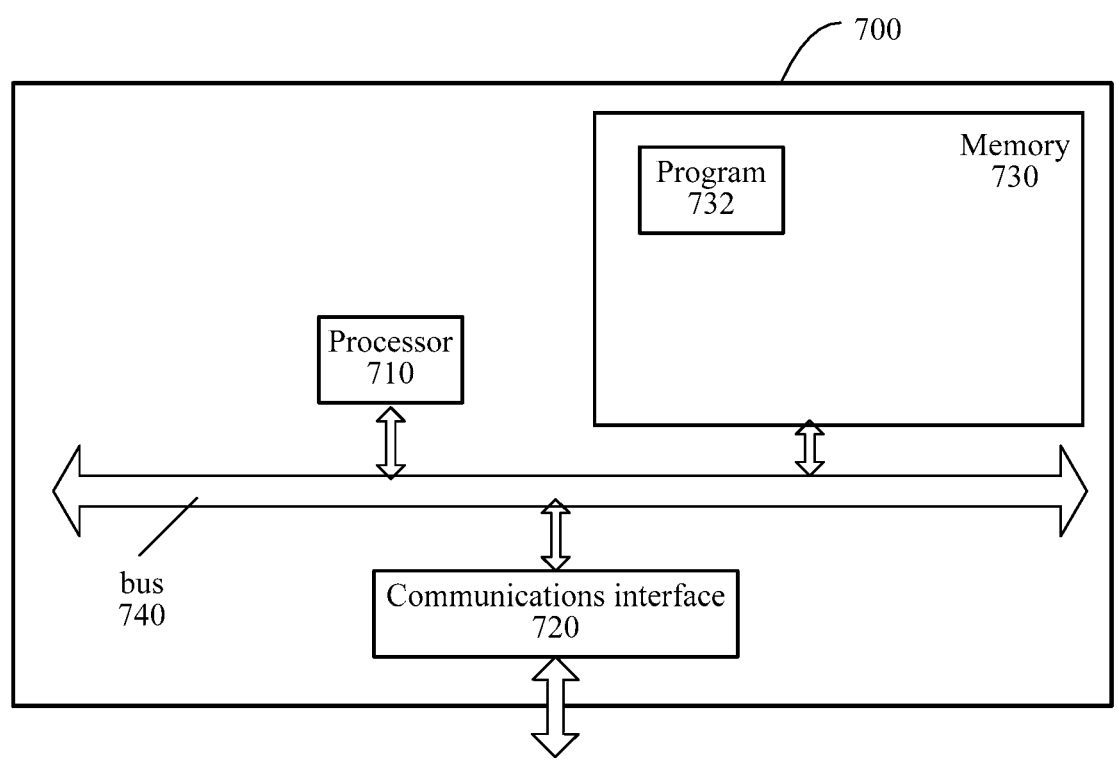
FIG. 7 is a structural block diagram of another example of the second embodiment of the sharing device of the present application.

FIG. 7 is a schematic structural diagram of another example of the second embodiment of the sharing device of the present application. The specific embodiments of the present application are not intended to limit the specific implementation of the sharing device. As shown in FIG. 7, a sharing device 700 may comprise:

a processor 710, a communications interface 720, a memory 730, and a communications bus 740, wherein:

the processor 710, the communications interface 720, and the memory 730 communicate with each other by using the communications bus 740;

the communications interface 720 is configured to communicate with a network element such as a client; and the processor 710 is configured to execute a program 732, and specifically can perform relevant steps in the aforementioned embodiments of the method shown in FIG. 3.

Specifically, the program 732 may comprise program code, wherein the program code comprises a computer operation instruction.

The processor 710 may be a Central Processing Unit (CPU), an Application Specific Integrated Circuit (ASIC), or one or more integrated circuits configured to implement the embodiments of the present application.

The memory 730 is configured to store the program 732. The memory 730 may comprise a high speed RAM memory, or may also comprise a non-volatile memory such as at least one magnetic disk storage. The program 732 may specifically be configured to cause the sharing device 700 to execute the following steps:

determining at least one piece of first information associated with a field of view of at least one user; and determining a sharing request policy of at least one hologram of the at least one user at least according to the at least one piece of first information, wherein the sharing request policy comprises: a sending sequence that is determined, for any one of the at least one user, at least according to a degree of association between a field of view of at least one other user among the at least one user and a field of view of the any user, and is for sending a sharing request of at least one hologram of the at least one other user.

For the specific implementation of the steps in the program 732, refer to the corresponding descriptions of corresponding steps and units in the foregoing embodiments, which are not described herein again. It may be clearly understood by a person skilled in the art that, for the purpose of convenient and brief description, reference may be made to the description of corresponding processes in the foregoing method embodiments for detailed working processes of the foregoing devices and modules, and details are not described herein again.

It may be clearly understood by a person skilled in the art that, for the purpose of convenient and brief description, reference may be made to the description of corresponding processes in the foregoing apparatus embodiments for detailed working processes of the foregoing devices and modules, and details are not described herein again.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising hand-held devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and steps of the method may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises but not limited to a USB flash drive, a removable hard disk, a Read-Only Memory (ROM), a Random Access Memory (RAM), an Erasable Programmable Read-Only Memory (EPROM), an Electrically Erasable Programmable Read-Only Memory (EEPROM), a flash memory or other solid-state memory technology, a CD-ROM, a Digital Versatile Disc (DVD), an HD-DVD, a Blue-Ray disc or other optical storage devices, a magnetic tape, magnetic disk storage or other magnetic storage devices, or any other medium that can be used for storing required information and can be accessed by a computer.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A sharing method, comprising:
   determining at least one piece of first information associated with a field of view of at least one user among a plurality of users; and
   determining a transmission policy of at least one hologram of the at least one user at least according to the at least one piece of first information, wherein the transmission policy comprises:
      a sequence that is determined, for any one of the plurality of users, at least according to a degree of association between a field of view of at least one other user among the plurality of users and a field of view of the any one of the plurality of users and is for transmitting at least one hologram of the any one of the plurality of users to the at least one other user,
      wherein the degree of association with the field of view of the any one of the plurality of users comprises:
         a degree of proximity between the field of view of the at least one other user among the plurality of users and the field of view of the any one of the plurality of users, and/or an overlapping area between the field of view of the at least one other user among the plurality of users and the field of view of the any one of the plurality of users,
         wherein degrees of proximity are sorted according to overlapping areas when there is overlapping between the field of view of the at least one other user and the field of view of the any one of the plurality of users, and the degrees of proximity are sorted according to proximities between the field of view of the at least one other user and the field of view of the any one of the plurality of users from distal to proximal when there is no overlapping among the fields of view of users of the plurality of users.

2. The method of claim 1, wherein the determining a transmission policy of at least one hologram of the at least one user comprises:
   for the any one of the plurality of users, determining a degree of proximity between the field of view of the at least one other user and a field of view of the any one of the plurality of users at least according to the first information; and
   determining a sequence for transmitting the at least one hologram of the any one of the plurality of users according to a sequence of the degrees of proximity from proximal to distal.

3. The method of claim 1, wherein the determining a transmission policy of at least one hologram of the at least one user comprises:
   for the any one of the plurality of users, determining an overlapped range between the field of view of the at least one other user and a field of view of the any one of the plurality of users at least according to the first information; and
   determining a sequence for transmitting at least one hologram of the any one of the plurality of users according to a sequence of the overlapped ranges in descending order.

4. The method of claim 1, wherein
   the first information comprises information associated with a gaze direction of the at least one user; and
   the transmission policy further comprises:
      a sequence that is determined, for the any one of the plurality of users, at least according to a degree of association between a spatial position of at least one hologram of the any one of the plurality of users and a gaze direction of at least one other user among the plurality of users and is for transmitting the at least one hologram to the at least one other user.

5. The method of claim 4, further comprising:
   determining at least one piece of second information associated with the spatial position of the at least one hologram of the at least one user.

6. The method of claim 5, wherein the second information comprises:
   three-dimensional coordinates and a coordinate system reference of the at least one hologram in a physical space in which a corresponding user is located.

7. The method of claim 5, wherein the determining at least one piece of second information associated with the spatial position of the at least one hologram of the at least one user comprises:
   receiving the at least one piece of second information.

8. The method of claim 1, further comprising:
   sending at least one hologram of the any one of the plurality of users according to the transmission policy in response to a sharing request from the at least one other user.

9. The method of claim 1, wherein the first information comprises any one of the following:
   information about a field-of-view range, a user position, a user line-of-sight direction, a user viewing angle, and a user voice.

10. The method of claim 1, wherein the determining at least one piece of first information associated with a field of view of at least one user comprises:
    receiving the at least one piece of first information.

11. A sharing method, comprising:
    determining at least one piece of first information associated with a field of view of at least one user among a plurality of users; and determining a sharing request policy of at least one hologram of the at least one user at least according to the at least one piece of first information, wherein the sharing request policy comprises:
- a sending sequence that is determined, for any one of the plurality of users, at least according to a degree of association between a field of view of at least one other user among the plurality of users and a field of view of the any one of the plurality of users, and is for sending a sharing request of at least one hologram of the at least one other user,
- wherein the degree of association with the field of view of the any one of the plurality of users comprises:
  - a degree of proximity between the field of view of the at least one other user among the plurality of users and the field of view of the any one of the plurality of users and/or an overlapping area between the field of view of the at least one other user among the plurality of users and the field of view of the any one of the plurality of users,
  - wherein degrees of proximity are sorted according to overlapping areas when there is overlapping between the field of view of the at least one other user and the field of view of the any one of the plurality of users, and the degrees of proximity are sorted according to proximities between the field of view of the at least one other user and the field of view of the any one of the plurality of users from distal to proximal when there is no overlapping among the fields of view of users of the plurality of users.

12. The method of claim 11, wherein the determining a sharing request policy of at least one hologram of the at least one user comprises:
- for the any one of the plurality of users, determining a degree of proximity between the field of view of the at least one other user and a field of view of the any one of the plurality of users at least according to the first information; and
- determining a sharing request policy of the at least one hologram of the at least one other user according to a sequence of the degrees of proximity from proximal to distal.

13. The method of claim 11, wherein the determining a sharing request policy of at least one hologram of the at least one user comprises:
- for the any one of the plurality of users, determining an overlapped range between the field of view of the at least one other user and a field of view of the any one of the plurality of users at least according to the first information; and
- determining a sharing request policy of at least one hologram of the at least one other user according to a sequence of the overlapped ranges in descending order.

14. The method of claim 13, wherein the determining at least one piece of second information associated with the spatial position of the at least one hologram of the at least one user comprises:
- receiving the at least one piece of second information.

15. The method of claim 11, wherein the first information further comprises:
- information associated with a gaze direction of the at least one user; and
- the sharing request policy further comprises:
  - a sequence that is determined, for the any one of the plurality of users, at least according to a degree of association between a spatial position of a hologram of at least one other user among the plurality of users and the gaze direction of the any one of the plurality of users, and is for requesting sharing for at least one hologram of the at least one other user.

16. The method of claim 15, further comprising:
- determining at least one piece of second information associated with the spatial position of the at least one hologram of the at least one user.

17. The method of claim 16, wherein the second information comprises:
- three-dimensional coordinates and a coordinate system reference of the at least one hologram in a physical space in which a corresponding user is located.

18. The method of claim 16, further comprising:
- receiving at least one hologram from the at least one other user; and
- performing augmented reality presentation based on the at least one hologram.

19. The method of claim 11, further comprising:
- sending a sharing request according to the sharing request policy.

20. The method of claim 11, wherein the first information comprises any one of the following:
- information about a field-of-view range, a user position, a user line-of-sight direction, a user viewing angle, and a user voice.

21. The method of claim 11, wherein the determining at least one piece of first information associated with a field of view of at least one user comprises:
- receiving the at least one piece of first information.

22. A sharing device, comprising:
- a memory configured to store an instruction; and
- a processor configured to execute the instruction stored in the memory, wherein the instruction enables the processor to execute operations including:
  - determining at least one piece of first information associated with a field of view of at least one user among a plurality of users; and
  - determining a transmission policy of at least one hologram of the at least one user at least according to the at least one piece of first information, wherein the transmission policy comprises:
    - a sequence that is determined, for any one of the plurality of users, at least according to a degree of association between a field of view of at least one other user among the plurality of users and a field of view of the any one of the plurality of users and is for transmitting at least one hologram of the any one of the plurality of users to the at least one other user,
    - wherein the degree of association with the field of view of the any one of the plurality of users comprises:
      - a degree of proximity between the field of view of the at least one other user among the plurality of users and the field of view of the any one of the plurality of users and/or an overlapping area between the field of view of the at least one other user among the plurality of users and the field of view of the any one of the plurality of users,
      - wherein degrees of proximity are sorted according to overlapping areas when there is overlapping between the field of view of the at least one other user and the field of view of the any one of the plurality of users, and the degrees of proximity are sorted according to proximities between the field of view of the at least one other user and the field of view of the any one of the plurality of users from distal to proximal when there is no overlapping among the fields of view of users of the plurality of users.

23. The device of claim 22, wherein:
for the any one of the plurality of users, a degree of proximity between the field of view of the at least one other user and the field of view of the any one of the plurality of users is determined at least according to the first information; and
a sequence for transmitting the at least one hologram of the any one of the plurality of users is determined according to a sequence of degrees of proximity from proximal to distal.

24. The device of claim 22, wherein:
for the any one of the plurality of users, an overlapped range between the field of view of the at least one other user and the field of view of the any one of the plurality of users is determined at least according to the first information; and
a sequence for transmitting the at least one hologram of the any one of the plurality of users is determined according to a sequence of the overlapped ranges in descending order.

25. The device of claim 22, wherein:
at least one piece of second information associated with the spatial position of the at least one hologram of the at least one user is determined.

26. The device of claim 25, wherein the at least one piece of second information is received.

27. The device of claim 22, wherein:
the at least one hologram of the any one of the plurality of users is sent according to the transmission policy in response to a sharing request from the at least one other user.

28. The device of claim 22, wherein the at least one piece of first information is received.

29. A sharing device, comprising:
a memory configured to store an instruction; and
a processor configured to execute the instruction stored in the memory, wherein the instruction enables the processor to execute operations including:
determining at least one piece of first information associated with a field of view of at least one user among a plurality of users; and
determining a sharing request policy of at least one hologram of the at least one user at least according to the at least one piece of first information, wherein the sharing request policy comprises:
a sending sequence that is determined, for any one of the plurality of users, at least according to a degree of association between a field of view of at least one other user among the plurality of users and a field of view of the any one of the plurality of users, and is for sending a sharing request of at least one hologram of the at least one other user,
wherein the degree of association with the field of view of the any one of the plurality of users comprises:
a degree of proximity between the field of view of the at least one other user among the plurality of users and the field of view of the any one of the plurality of users and/or an overlapping area between the field of view of the at least one other user among the plurality of users and the field of view of the any one of the plurality of users,
wherein degrees of proximity are sorted according to overlapping areas when there is overlapping between the field of view of the at least one other user and the field of view of the any one of the plurality of users, and the degrees of proximity are sorted according to proximities between the field of view of the at least one other user and the field of view of the any one of the plurality of users from distal to proximal when there is no overlapping among the fields of view of users of plurality of users.

30. The device of claim 29, wherein:
for the any one of the plurality of users, a degree of proximity between the field of view of the at least one other user and a field of view of the any one of the plurality of users is determined at least according to the at least one piece of first information; and
a sharing request policy of the at least one hologram of the at least one other user is determined according to a sequence of degrees of proximity from proximal to distal.

31. The device of claim 29, wherein:
for the any one of the plurality of users, an overlapped range between the field of view of the at least one other user and the field of view of the any one of the plurality of users is determined at least according to the at least one piece of first information; and
the sharing request policy of the at least one hologram of the at least one other user is determined according to a sequence of the overlapped ranges in descending order.

32. The device of claim 29, wherein:
at least one piece of second information associated with the spatial position of the at least one hologram of the at least one user is determined.

33. The device of claim 32, wherein the at least one piece of second information is received.

34. The device of claim 32, wherein:
the at least one hologram is received from the at least one other user; and
augmented reality presentation is performed based on the at least one hologram.

35. The device of claim 29, wherein:
a sharing request is sent according to the sharing request policy.

36. The device of claim 29, wherein: the at least one piece of first information is received.

* * * * *